United States Patent
Broers et al.

(10) Patent No.: US 10,136,502 B2
(45) Date of Patent: Nov. 20, 2018

(54) THERMAL SENSING

(71) Applicant: PHILIPS LIGHTING HOLDING B.V., Eindhoven (NL)

(72) Inventors: Harry Broers, 'S-Hertogenbosch (NL); Ruben Rajagopalan, Neuss (DE)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/111,924

(22) PCT Filed: Dec. 30, 2014

(86) PCT No.: PCT/EP2014/079423
§ 371 (c)(1),
(2) Date: Jul. 15, 2016

(87) PCT Pub. No.: WO2015/106949
PCT Pub. Date: Jul. 23, 2015

(65) Prior Publication Data
US 2016/0338175 A1    Nov. 17, 2016

(30) Foreign Application Priority Data
Jan. 16, 2014 (EP) .................................. 14151454

(51) Int. Cl.
*H05B 37/02* (2006.01)
*G06K 9/20* (2006.01)
(Continued)

(52) U.S. Cl.
CPC .......... *H05B 37/0227* (2013.01); *F21S 8/086* (2013.01); *G01J 5/0037* (2013.01);
(Continued)

(58) Field of Classification Search
CPC ............ H05B 37/0227; H05B 37/0245; H05B 37/0254; H05B 37/03
USPC ................................. 315/152, 158, 307, 312
See application file for complete search history.

(56) References Cited

U.S. PATENT DOCUMENTS 5,839,821 A    11/1998  Lezotte
9,967,960 B2 *  5/2018  Bora .................. H05B 37/0281
(Continued)

FOREIGN PATENT DOCUMENTS

CN    202484677 U    10/2012
JP      8273838 A    10/1996
(Continued)

*Primary Examiner* — Tung X Le
(74) *Attorney, Agent, or Firm* — Meenakshy Chakravorty

(57) ABSTRACT

A controller comprising: an output for controlling one or more outdoor lighting device to illuminate an outdoor environment; an input for receiving temperature information from a temperature sensor comprising a plurality of temperature sensing elements; and a control module. The control module is configured to: use the temperature information received from the temperature sensor to detect motion in a sensing region of the temperature sensor and control the one or more lighting device based on the detected motion, and additionally use the temperature information received from the temperature sensor to detect conditions of the environment in the sensing region and further control the one or more lighting device based on the detected conditions.

14 Claims, 16 Drawing Sheets

(51) Int. Cl.
  *F21S 8/08*      (2006.01)
  *G01J 5/00*      (2006.01)
  *G01J 5/12*      (2006.01)
  F21S 2/00        (2016.01)
  F21W 131/103     (2006.01)

(52) U.S. Cl.
  CPC .............. *G01J 5/12* (2013.01); *G06K 9/2027* (2013.01); *F21S 2/00* (2013.01); *F21W 2131/103* (2013.01); *G01J 2005/123* (2013.01)

(56) References Cited

U.S. PATENT DOCUMENTS

| | | | | |
|---|---|---|---|---|
| 2010/0001652 A1* | 1/2010 | Damsleth | ........... | H05B 37/0227 315/149 |
| 2011/0140612 A1* | 6/2011 | Mohan | ............... | H05B 37/0218 315/149 |
| 2013/0249410 A1* | 9/2013 | Thompson | ......... | H05B 37/0227 315/158 |
| 2014/0239817 A1* | 8/2014 | Leinen | .................. | H05B 37/02 315/152 |
| 2015/0130351 A1* | 5/2015 | Braunstein | ......... | H05B 37/0227 315/86 |

FOREIGN PATENT DOCUMENTS

| | | | |
|---|---|---|---|
| JP | 10239450 | A | 9/1998 |
| JP | 2001210478 | A | 8/2001 |
| KR | 20110010171 | A | 2/2011 |
| KR | 20130031727 | A | 3/2013 |
| WO | 2008122935 | A1 | 10/2008 |
| WO | 2011055261 | A1 | 5/2011 |

* cited by examiner

THERMAL SENSING

CROSS-REFERENCE TO PRIOR APPLICATIONS

This application is the U.S. National Phase application under 35 U.S.C. § 371 of International Application No. PCT/IB2014/079423, filed on Dec. 30, 2014, which claims the benefit of European Patent Application No. 14151454.7, filed on Jan. 16, 2014. These applications are hereby incorporated by reference herein.

TECHNICAL FIELD

The present disclosure relates to the thermal sensing of an outdoor space to control one or more lighting devices.

BACKGROUND

In current lighting applications, energy efficiency is a more and more important subject. One possible way to reduce the energy consumption of a lighting system is to switch off or dim one or more light sources thereof when no object (i.e. vehicle or pedestrian) is present in a space, and conversely to switch on or dim up the light sources(s) when an object is present in the space. In order to do this, the presence of an object in the relevant space has to be detected. There is a strong need for sensor-driven light control systems, because of their advantage of bringing down the energy consumption of the light source(s) thereof, and thereby improving cost-savings, and life-time of the light source(s).

Conventional thermal sensors typically measure temperature of a certain point-of-contact. However, with advancements in Micro-electro-mechanical systems (MEMS) technology, thermopile array sensors can measure temperature of a specified area without any contact to an object. It is known to use thermopile array sensors to control the light source(s) of a lighting system.

SUMMARY

The inventors have recognised that in addition to using a thermopile array sensor for detecting motion of an object to control light source(s), the output of thermopile array sensor can be re-used to determine additional information about the scene around the lighting system to provide enhanced control of the light source(s).

According to one aspect disclosed herein, there is provided a controller comprising: an output for controlling one or more outdoor lighting device to illuminate an outdoor environment; an input for receiving temperature information from a temperature sensor comprising a plurality of temperature sensing elements; and a control module configured to: use the temperature information received from the temperature sensor to detect motion in a sensing region of the temperature sensor and control the one or more lighting device based on the detected motion; and use the temperature information received from the temperature sensor to detect conditions of the environment in the sensing region and further control the one or more lighting device based on the detected conditions.

The control module may be further configured to classify the object as one of a plurality of object types and control the one or more lighting device based on the object type.

In one embodiment, the detected conditions of the environment in the sensing region comprise road layout information, wherein the control module is configured to control the one or more lighting device based on the detected road layout information.

In one embodiment, the detected conditions of the environment in the sensing region comprise weather conditions, wherein the control module is configured to: detect the weather conditions based on a ratio of a peak temperature measured by the temperature sensor when no object is present in the sensing region of the temperature sensor and a peak temperature measured by the temperature sensor when an object is present in the sensing region of the temperature sensor; and control the one or more lighting device based on the detected weather conditions.

The control module may be configured to adapt its motion detection sensitivity based on the ratio of a peak temperature measured by the temperature sensor when no object is present in the sensing region of the temperature sensor and a peak temperature measured by the temperature sensor when an object is present in the sensing region of the temperature sensor.

In one embodiment, the control module is configured to adapt its motion detection sensitivity based on (i) temperature information received from a further temperature sensor coupled to the control module, or (ii) time of day information received from a timer coupled to the control module.

In one embodiment, the control module is configured to detect rainfall in the environment in the sensing region using the temperature information received from the temperature sensor and further control the one or more lighting device based on the detected rainfall.

In one embodiment, the detected conditions of the environment in the sensing region comprise stagnation of water on a surface in the sensing region, wherein the control module is configured to control the one or more lighting device based on the detected water stagnation.

In one embodiment, the detected conditions of the environment in the sensing region comprise absorption of water in a surface in the sensing region, wherein the control module is configured to control the one or more lighting device based on the detected surface water absorption.

In one embodiment, the temperature sensor is a one dimensional thermopile array sensor and the control module is further configured to: detect the direction of motion of an object in the sensing region of the one dimensional thermopile array sensor based on the temperature information received from the one dimensional thermopile array sensor; and control the one or more lighting device based on the detected direction of motion.

According to another aspect disclosed herein, there is provided a lighting system comprising the controller, the one or more lighting device, and the temperature sensor.

The orientation of the sensing region of the temperature sensor may be controlled based on the detected conditions of the environment in the sensing region using orientation control means coupled to the temperature sensor.

The temperature sensor may comprise an input for receiving orientation information from a remote source, and the orientation of the sensing region of the temperature sensor is controlled based on the received orientation information.

The temperature sensor may for example be a thermopile array sensor.

According to a further aspect, there is provided a computer program product for controlling one or more outdoor lighting device to illuminate an environment, the computer program product comprising code embodied on a computer-readable medium and being configured so as when executed on a processor to: receive temperature information from a temperature sensor comprising a plurality of temperature sensing elements; use the temperature information received from the temperature sensor to detect motion in a sensing region of the temperature sensor and control the one or more lighting device based on the detected motion; and use the temperature information received from the temperature sensor to detect conditions of the environment in the sensing region and further control the one or more lighting device based on the detected conditions.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE DRAWINGS

For a better understanding of the present disclosure and to show how embodiments may be put into effect, reference is made to the accompanying drawings in which.

DETAILED DESCRIPTION

Figure 1:
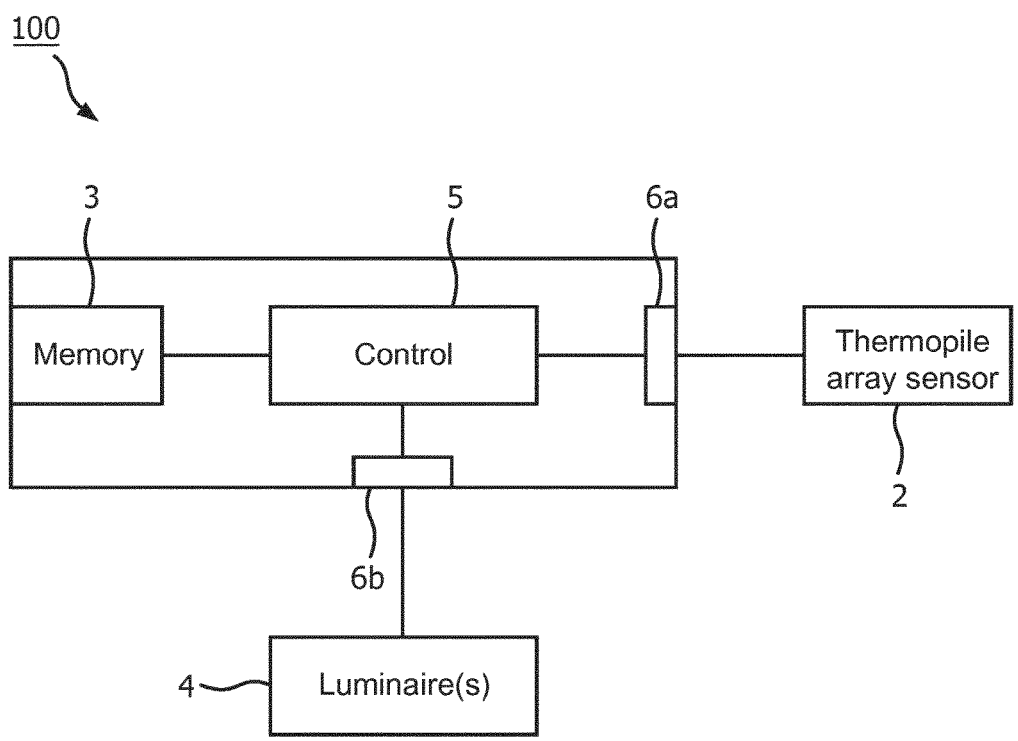
FIG. 1 is a schematic block diagram of a lighting system.

Reference is first made to FIG. 1 which illustrates a schematic block diagram of a lighting system 100.

The lighting system 100 comprises a controller 1 coupled to a temperature sensor 2 comprising a plurality of temperature sensing elements, and one or more outdoor lighting devices 4 in the form of one or more luminaires operable to emit light to illuminate an outdoor environment of the lighting system 100. FIG. 1 shows the temperature sensor 2 as a thermopile array sensor.

Figure 2A:
FIG. 2a illustrates the pixels of an example one dimensional thermopile array sensor.
Figure 2B:
FIG. 2b illustrates the pixels of an example two dimensional thermopile array sensor.

A thermopile is a passive infrared radiation (IR) detector made up of a series of electrically connected thermocouple pairs to convert thermal energy into electrical energy. The thermopile array sensor 2 comprises multiple thermopiles arranged as pixels on a silicon chip. The multiple thermopiles may be arranged in a line to form a one dimensional thermopile array 200 (comprising pixels p1-p4) as shown in FIG. 2a. Alternatively the multiple thermopiles may be arranged in a grid to form a two dimensional thermopile array 250 as shown in FIG. 2b. The grid may comprise for example a 4×4 array comprising 16 pixels in total (p1-p16), an 8×8 array comprising 64 pixels in total, or any other sized array. It will be appreciated that the thermopile array sensor 2 may be one or two dimensional, comprising any number of pixels.

The thermopile array sensor 2 provides an output signal which represents real temperature data for each pixel. The output interface of the thermopile array sensor 2 (output interface not shown in FIG. 1) may comprise for example an I$^2$C interface. The controller 1 comprises a control module 5 which is coupled to the thermopile array sensor 2 via a first interface 6a. Thus the control module 5 is configured to receive temperature information from the thermopile array sensor 2 via the first interface 6a.

The control module 5 is further configured to control the amount of light emitted from the luminaire(s) 4 by transmitting appropriate control signals to the luminaire(s) 4 via an interface 6b. The luminaire(s) 4 are configured to operate in a plurality of operating states as will be described in further detail herein. The functionality of the control module 5 of the controller 1 may be implemented in code (software) stored on a memory comprising one or more storage media, and arranged for execution on a processor comprising on or more processing units. The code is configured so as when fetched from the memory and executed on the processor to perform operations in line with embodiments discussed below. Alternatively it is not excluded that some or all of the functionality of the control module 5 is implemented in dedicated hardware circuitry, or configurable hardware circuitry like an FPGA.

Figure 3:
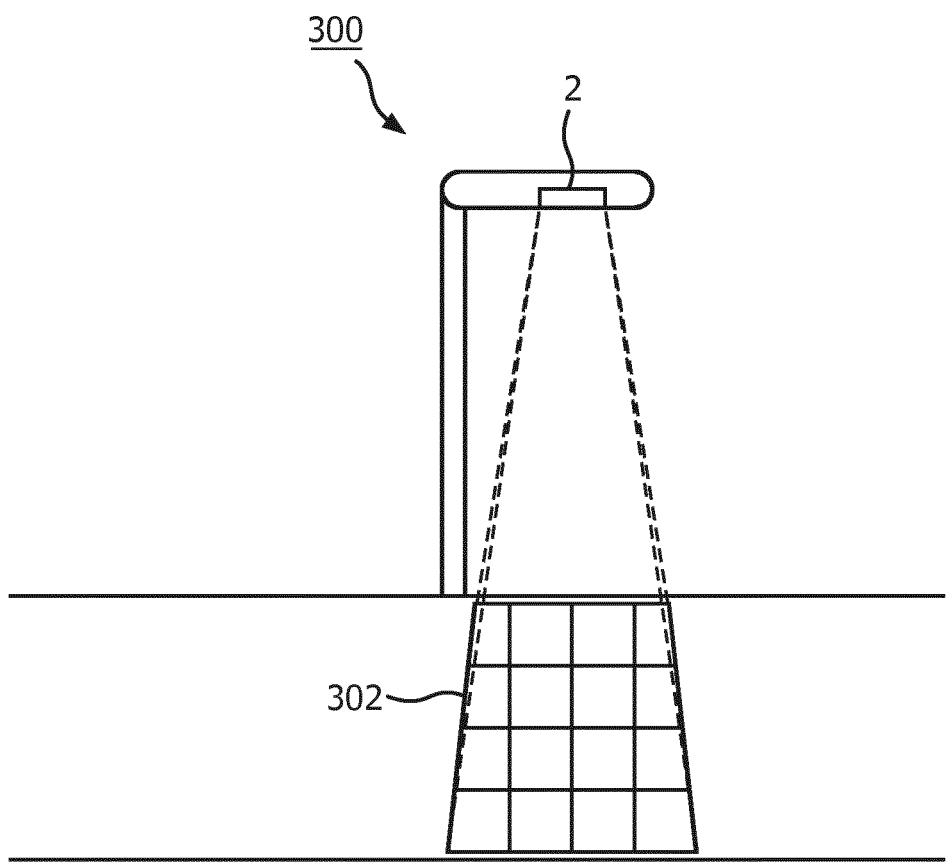
FIG. 3 illustrates the sensing region of a two dimensional thermopile array sensor.

As illustrated in FIG. 3, the lighting system 100 may be placed in an outdoor environment, for example the one or more lighting devices 4 may be a component of an outdoor street light 300 suitable for lighting car parks and roads etc. Whilst FIG. 3 shows the thermopile array sensor 2 being fully integrated into the outdoor street light 300, one or more of the controller 1 and the thermopile array sensor 2 may be housed in a unit separate to the outdoor street light 300, albeit connected to the one or more lighting devices 4 of the outdoor street light 300.

The thermopile array sensor 2 uses a lens (which may be integrated into, or coupled to, the thermopile array sensor 2) to measure the temperature within a sensing region (SR) 302 associated with the thermopile array sensor 2. The thermopile array sensor 2 may measure the temperature within its SR 302 at a certain frame rate (for example 10 frames/sec or 1 frame/sec).

Figure 4A:
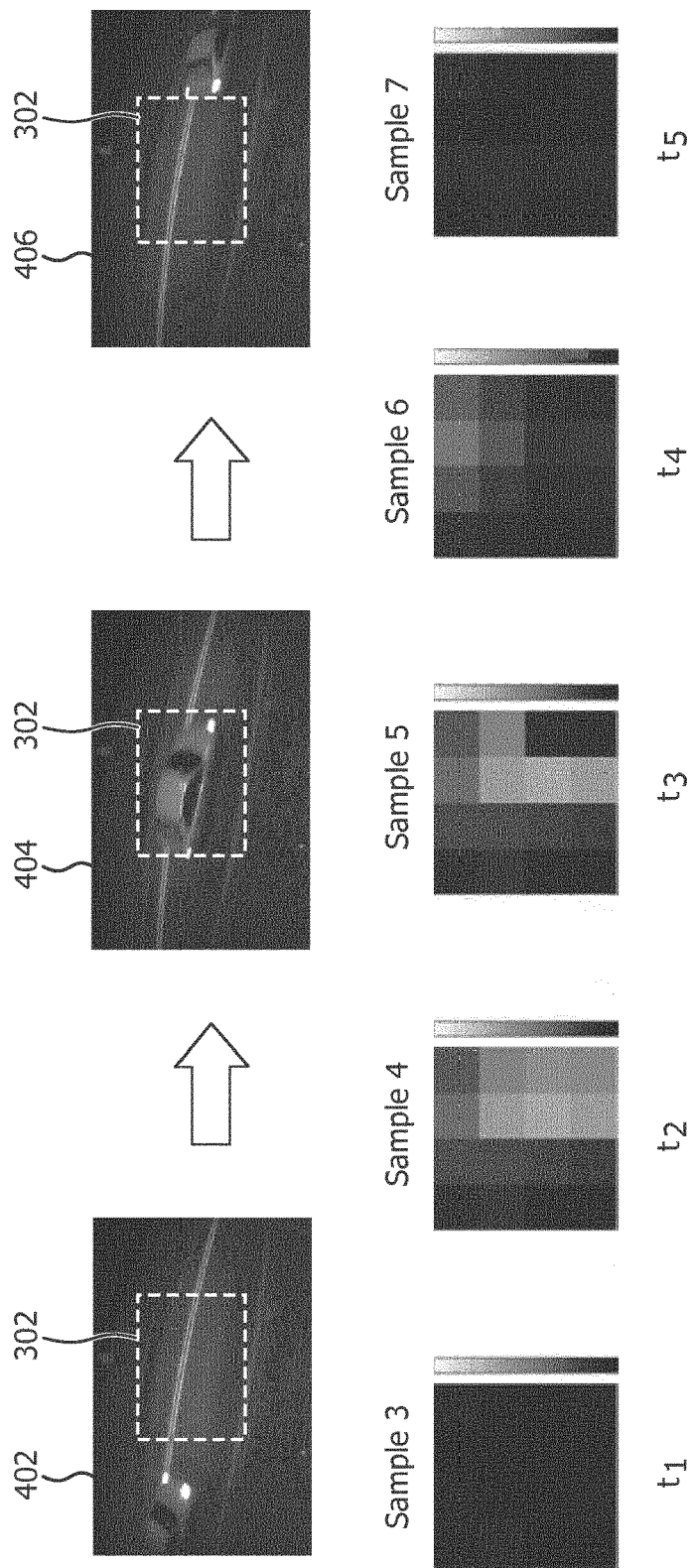
FIG. 4a illustrates vehicle motion detection by a two dimensional thermopile array sensor.
Figure 4B:
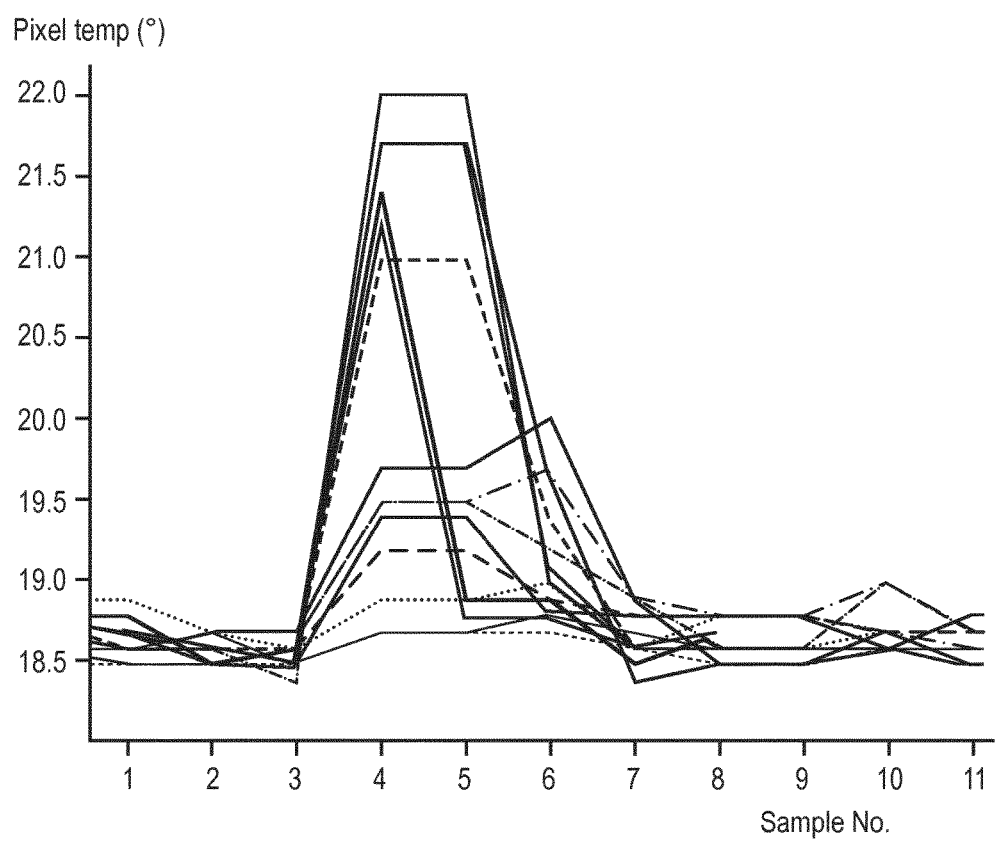
FIG. 4b graphically illustrates temperature data output from each pixel of a two dimensional thermopile array sensor during vehicle motion detection.

Reference is now made to FIGS. 4a and 4b which illustrates how motion detection of an object is performed by a thermopile array sensor 2 comprising a 4×4 pixel array. In this example the object is a vehicle.

Scenes 402, 404 and 406 illustrate the SR 302 of thermopile array sensor 2 being focused on a road.

In scene 402 a vehicle is approaching, but has not yet entered the SR 302 of thermopile array sensor 2. At this time ($t_1$) a sample (sample 3) of temperature data for each pixel is captured by the thermopile array sensor 2 and supplied to the control module 5 via interface 6a. Based on receiving this temperature data the control module 5 is able to identify a temperature range measured by the pixels in the pixel array which corresponds to when no object is present in the SR 302 of the thermopile array sensor 2 and control the luminaire(s) 4 to operate in a first operating state during which the luminaire(s) 4 illuminate the environment of the lighting system 100 by emitting light at a first illumination level (this may include when the luminaire(s) 4 emit no light i.e. the luminaire(s) 4 are turned off). Reference to an "illumination level" used herein refers to the amount of light output from the luminaire(s) 4. The illumination level can be expressed in terms of illuminance (in lux) i.e. in terms of the amount of light emitted from the luminaire(s) 4 that is incident over a plane of interest (e.g. a road surface). It will be appreciated that other photometry units may also be used to express the amount of light output from the luminaire(s) 4.

As the vehicle passes through the SR 302 of thermopile array sensor 2 (shown in scene 404) samples of temperature data for each pixel is captured by the thermopile array sensor 2 and supplied to the control module 5 via interface 6a. As shown in FIG. 4a the temperature measured by pixels in the pixel array increases (represented by a lighter shade) due to the presence of the vehicle in the SR 302 of thermopile array sensor 2.

The control module 5 is configured to monitor the temperature data received from the thermopile array sensor 2. If the temperature data measured by one or more pixel of the pixel array of the thermopile array sensor 2 has reached a predetermined threshold temperature or increases by a predetermined amount above the peak temperature measured by a pixel in the pixel array when no object is present in the SR 302 of the thermopile array sensor 2, then the control module 5 is configured to control the luminaire(s) 4 to operate in a second operating state during which the luminaire(s) 4 illuminate the environment of the lighting system 100 by emitting light at a second illumination level, the second illumination level being higher than the first illumination level.

In scene 406, the vehicle has exited the SR 302 of thermopile array sensor 2. At this time ($t_5$) a sample (sample 7) of temperature data for each pixel is captured by the thermopile array sensor 2 and supplied to the control module 5 via interface 6a. Following a predetermined period during which the temperature measured by the pixels remains in the above temperature range (no object is present in the SR 302 of the thermopile array sensor 2), the control module 5 controls the luminaire(s) 4 to return to operate in the first operating state during which the luminaire(s) 4 illuminate the environment of the lighting system 100 by emitting light at the first illumination level.

FIG. 4b illustrates the temperature measured by each of the sixteen pixels in the pixel array of the thermopile array sensor 2 over a plurality of samples, in particular the increase in temperate measured by pixels in the pixel array in response to a vehicle passing through the SR 302 of thermopile array sensor 2.

Whilst motion detection of an object performed by a thermopile array sensor 2 is described above with reference to a vehicle passing through the SR 302 of thermopile array sensor 2, it will be appreciated that objects other than vehicles (for example pedestrians) may pass through the SR 302 of thermopile array sensor 2.

Figure 5A:
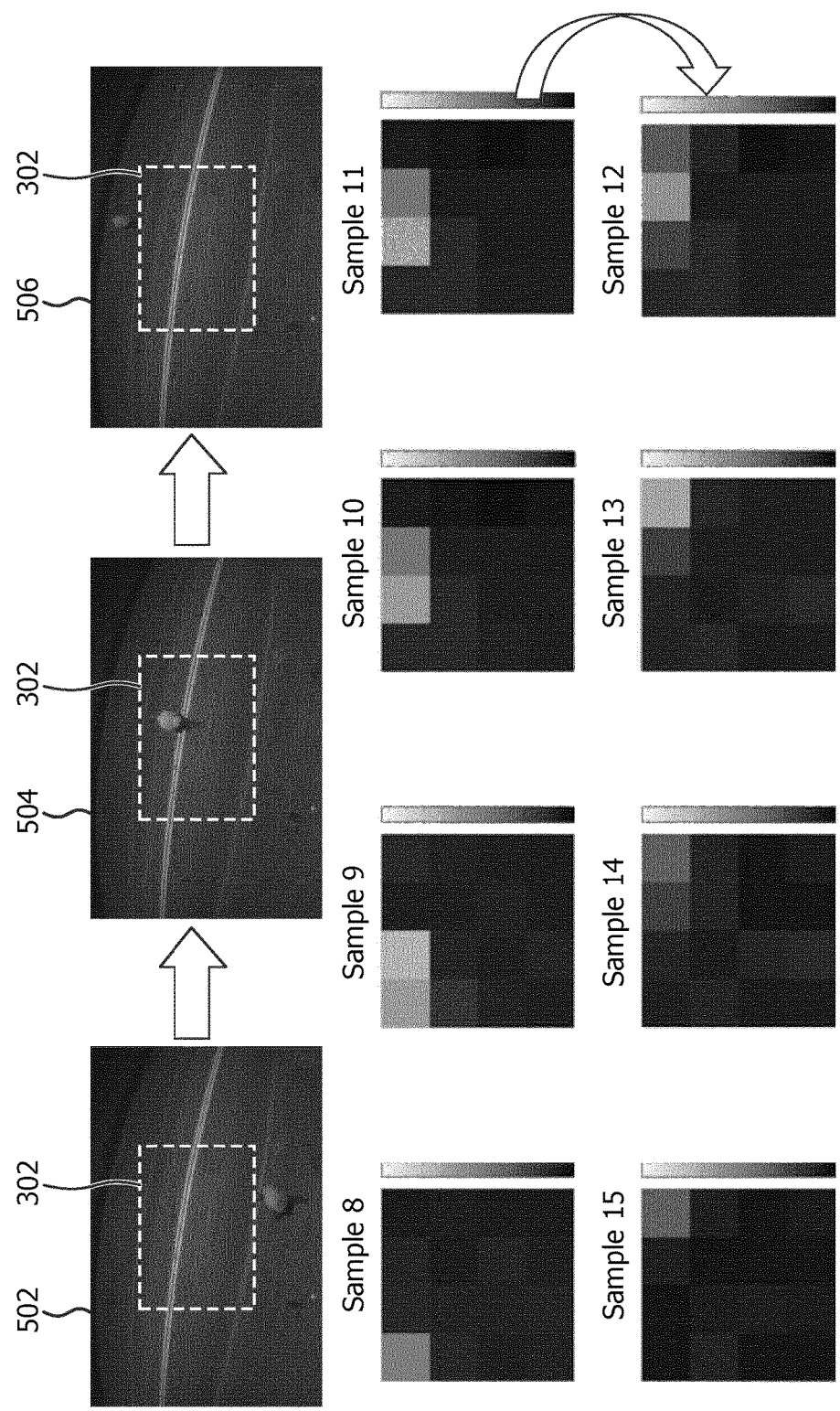
FIG. 5a illustrates pedestrian motion detection by a two dimensional thermopile array sensor.

FIG. 5a shows scenes 502, 504 and 506 in which a pedestrian approaches, enters and exits the SR 302 of thermopile array sensor 2 which is being focused on a road.

Figure 5B:
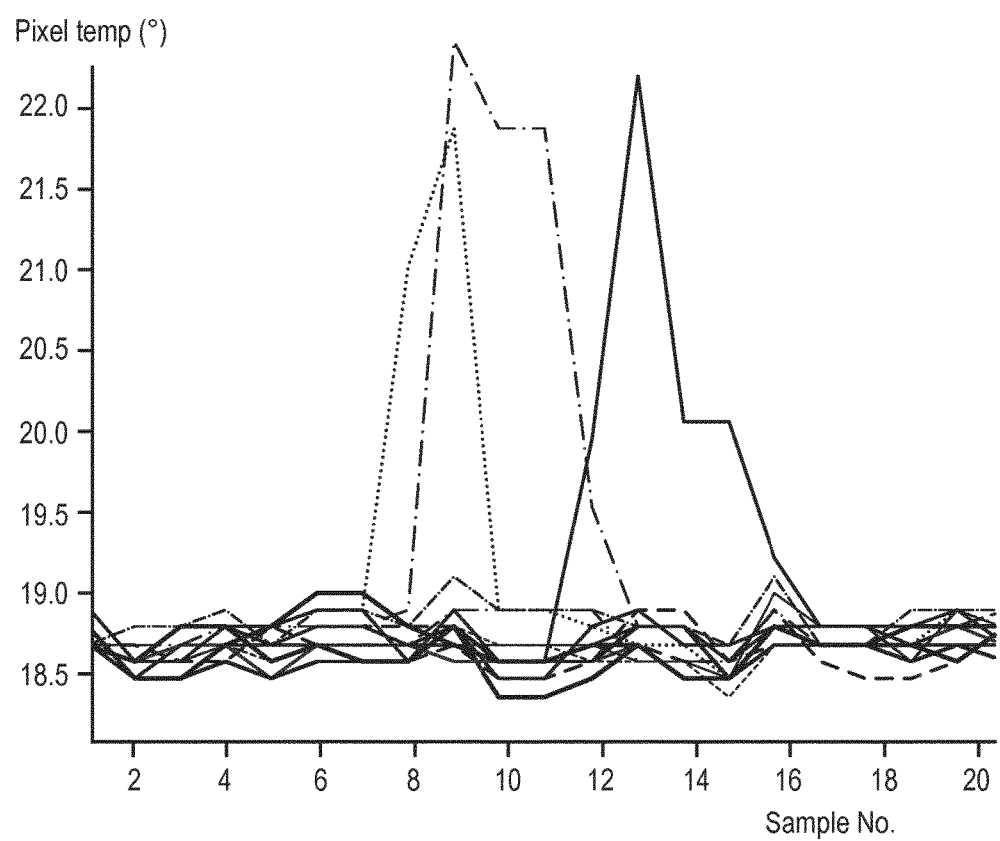
FIG. 5b graphically illustrates temperature data output from each pixel of a two dimensional thermopile array sensor during pedestrian motion detection.

As shown in FIGS. 5a and 5b motion detection of a pedestrian is performed by a thermopile array sensor 2 comprising a 4×4 pixel array in the same manner as that for detecting motion of a vehicle.

Comparing FIGS. 4b and 5b, it can be seen that spatiotemporal temperature signatures detected by the thermopile array sensor 2 when a vehicle passes through the SR 302 of thermopile array sensor 2 differ to the spatiotemporal temperature signatures detected by the thermopile array sensor 2 when a pedestrian passes through the SR 302 of thermopile array sensor 2.

As shown in FIG. 1, the control module 5 may be coupled to a memory 3. Memory 3 may be arranged to store spatiotemporal temperature signature information for various object types that may pass through the SR 302 of thermopile array sensor 2. By comparing detected spatiotemporal temperature signatures with the spatiotemporal temperature signature information stored in memory 3, the control module 5 may be configured to classify the object as one of a plurality of object types (e.g. vehicle or pedestrian) and control the luminaire(s) 4 accordingly.

For example, in response to a pedestrian passing through the SR 302 of thermopile array sensor 2 (shown in scene 504) samples of temperature data for each pixel are captured by the thermopile array sensor 2 and supplied to the control module 5 via interface 6a. As shown in FIG. 5a the temperature measured by pixels in the pixel array increases due to the presence of the pedestrian in the SR 302 of thermopile array sensor 2. The control module 5 is configured to monitor the temperature data received from the thermopile array sensor 2. By comparing detected spatiotemporal temperature signatures with the spatiotemporal temperature signature information stored in memory 3, the control module 5 is configured to classify the object as a pedestrian and thereby control the luminaire(s) 4 to operate in a second operating state during which the luminaire(s) 4 illuminate the environment of the lighting system 100 by emitting light at a second illumination level.

The second illumination level when a pedestrian is detected in the SR 302 of thermopile array sensor 2 may be higher than the second illumination level when a vehicle is detected in the SR 302 of thermopile array sensor 2. Alternatively, the second illumination level when a vehicle is detected in the SR 302 of thermopile array sensor 2 may be higher than the second illumination level when a pedestrian is detected in the SR 302 of thermopile array sensor 2.

Thus it can be seen that the control module 5 is configured to control the level of increase of light emitted from the luminaire(s) 4 when an object is detected depending on the type of object detected in the SR 302 of thermopile array sensor 2.

The inventors have recognised that in addition to using the thermopile array sensor 2 for motion detection and object classification as described above, additional details about the scene around the lighting installation, in particular conditions of the environment in the SR 302 the thermopile array sensor 2, can be of direct value to the lighting infrastructure. That is, the temperature information received from the thermopile array sensor 2 can be re-used by the control module 5 to provide enhanced control of the luminaire(s) 4 based on detected conditions of the environment in the SR 302 of the thermopile array sensor 2.

The various types of conditions of the environment in the SR 302 of the thermopile array sensor 2 which can be detected by the control module 5 based on the temperature information received from the thermopile array sensor 2 are outlined below.

Figure 6A:
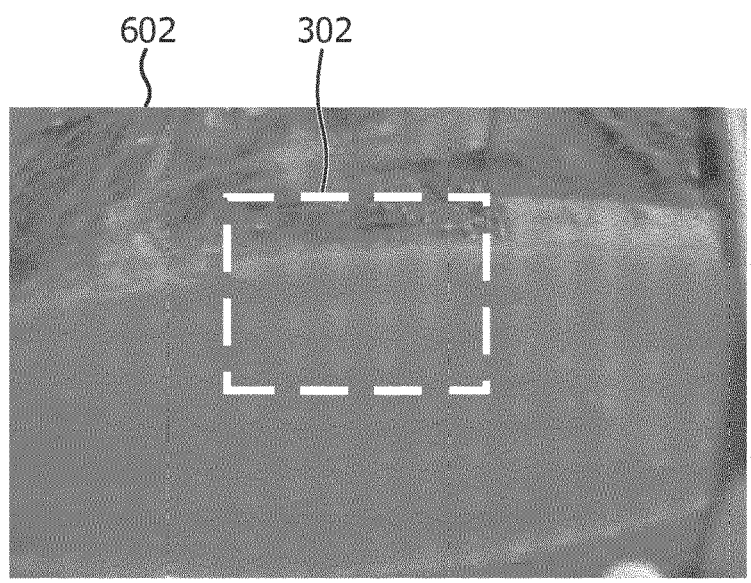
FIG. 6a illustrates the sensing region of a two dimensional thermopile array sensor.

Reference is now made to FIG. 6a which shows scene 602 illustrating the SR 302 of thermopile array sensor 2 being focused on both a road and pavement.

The different material properties of asphalt (road) and sand (pavement) result in the pixels of the pixel array of the thermopile array sensor 2 which are focused on the pavement measuring different temperatures to the pixels of the pixel array of the thermopile array sensor 2 which are focused on the road.

Figure 6B:
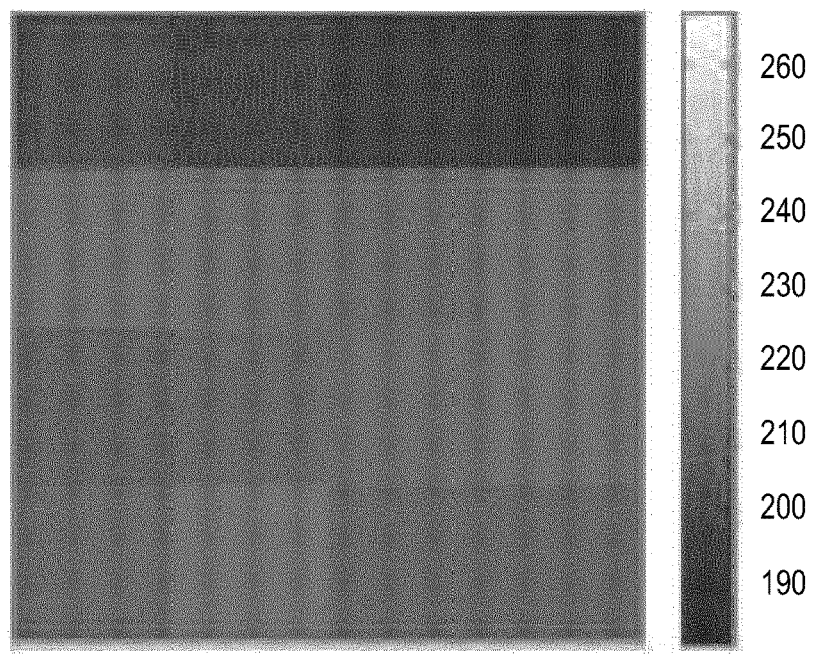
FIG. 6b illustrates how temperature data output from each pixel of a two dimensional thermopile array sensor at a point in time can be used to estimate road layout information.
Figure 6C:
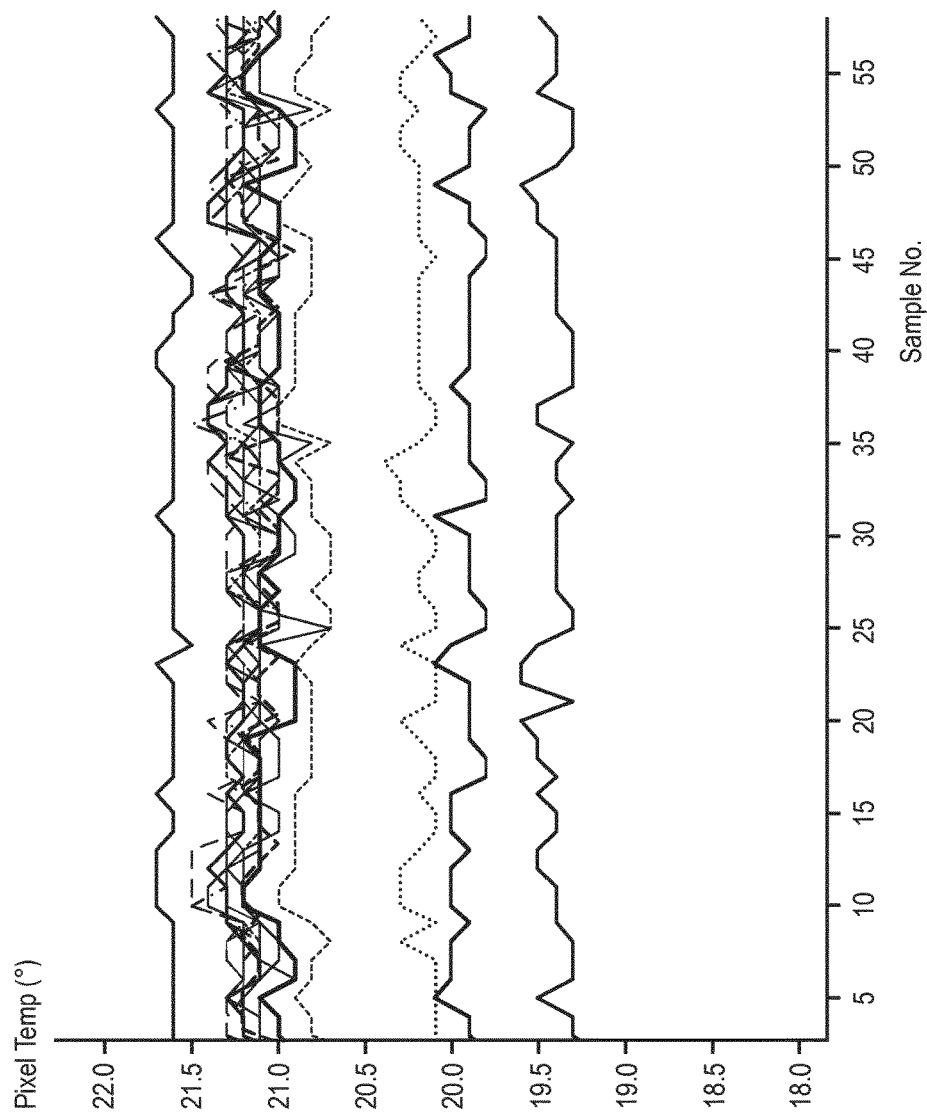
FIG. 6c illustrates how temperature data output from each pixel of a two dimensional thermopile array sensor collected over a period of time can be used to estimate road layout information.

FIG. 6b shows the measured temperature for each pixel of the pixel array of the thermopile array sensor 2 captured in one sample. As can be seen FIG. 6b, the temperature measured by pixels p14, p15, and p16 (focused on the pavement) is lower than the temperature measured by the remaining pixels of the pixel array of the thermopile array sensor 2. FIG. 6c illustrates this effect over a period of time by showing the measured temperature for each pixel of the pixel array of the thermopile array sensor 2 captured in a plurality of samples.

The control module 5 may be configured to estimate the road layout based on the temperature data received from the thermopile array sensor 2. For example, the control module 5 may estimate the road layout based by identifying differences in the temperatures measured by pixels of the pixel array of the thermopile array sensor 2.

Where the lighting system 100 comprises a plurality of outdoor lighting devices 4, the estimated road layout information may be used by the control module 5 to control the plurality of luminaires. For example the control module 5 may control the outdoor lighting devices 4 such that some of the outdoor lighting devices 4 emit light at a higher illumination level than others such that the light which is incident on the pavement is at a different (i.e. higher or lower) illumination level than the light which is incident on the road.

The controller 1 may be coupled to one or more further sensors (not shown in FIG. 1) that have a spatial mapping of their SR with the SR 302 of the thermopile array sensor 2. The estimated road layout gives an indication of traffic type (pedestrian on kerbside, vehicles on road, etc.) traffic speeds, and direction of travel. This information can be used by the control module 5 to tune the one or more further sensors. For example, this information can be used by the control module 5 to mask/filter the processing of the one or more further sensors such that the one or more further sensors are responsive to objects only with specific/desired patterns (detecting vehicles within a particular direction/speed limit, or detect motion differently on different spatial areas/zones).

Weather conditions of the environment in the SR 302 of the thermopile array sensor 2 can also be detected by the control module 5 based on the temperature data received from the thermopile array sensor 2.

In particular, the control module 5 is able to identify weather conditions based on the ratio of the peak temperature measured by a pixel in the pixel array when no object is present in the SR 302 of the thermopile array sensor 2 and the peak temperature measured by a pixel in the pixel array when an object is present in the SR 302 of the thermopile array sensor 2.

Referring back to FIG. 4b it can be seen that on a warm dry day, the control module 5 may identify a peak temperature measured by a pixel in the pixel array when no object is present in the SR 302 of the thermopile array sensor 2 of approximately 18.5° C., and a peak temperature measured by a pixel in the pixel array when an object is present in the SR 302 of the thermopile array sensor 2 of approximately 21.5° C.

Figure 7A:
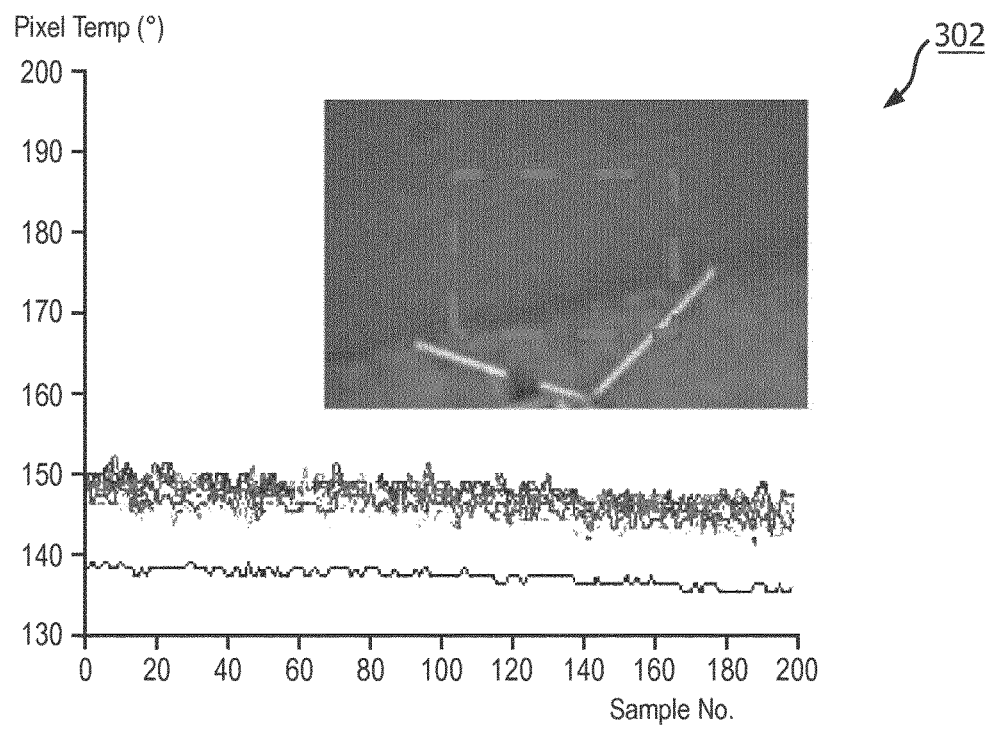
FIGS. 7a-d illustrates how temperature data output from each pixel of a two dimensional thermopile array sensor collected over a period of time can be used to weather conditions.
Figure 7B:
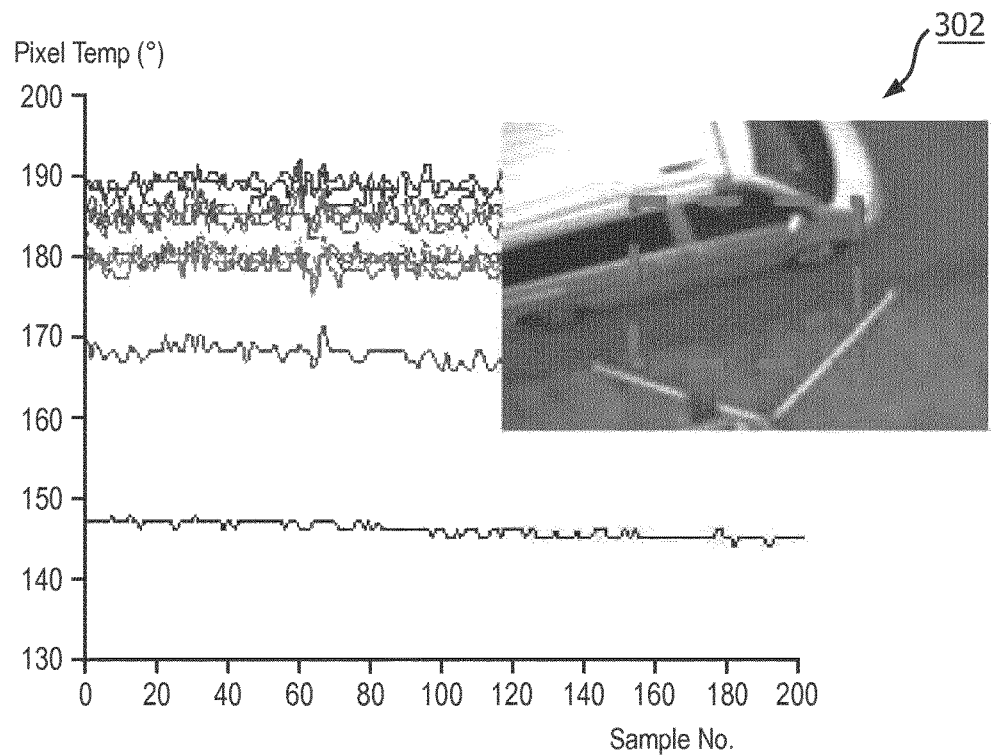

In contrast, as shown in FIGS. 7a and 7b on a cloudy evening the control module 5 may identify a peak temperature measured by a pixel in the pixel array when no object is present in the SR 302 of the thermopile array sensor 2 of approximately 15° C., and a peak temperature measured by a pixel in the pixel array when an object is present in the SR 302 of the thermopile array sensor 2 of approximately 19° C.

Figure 7C:
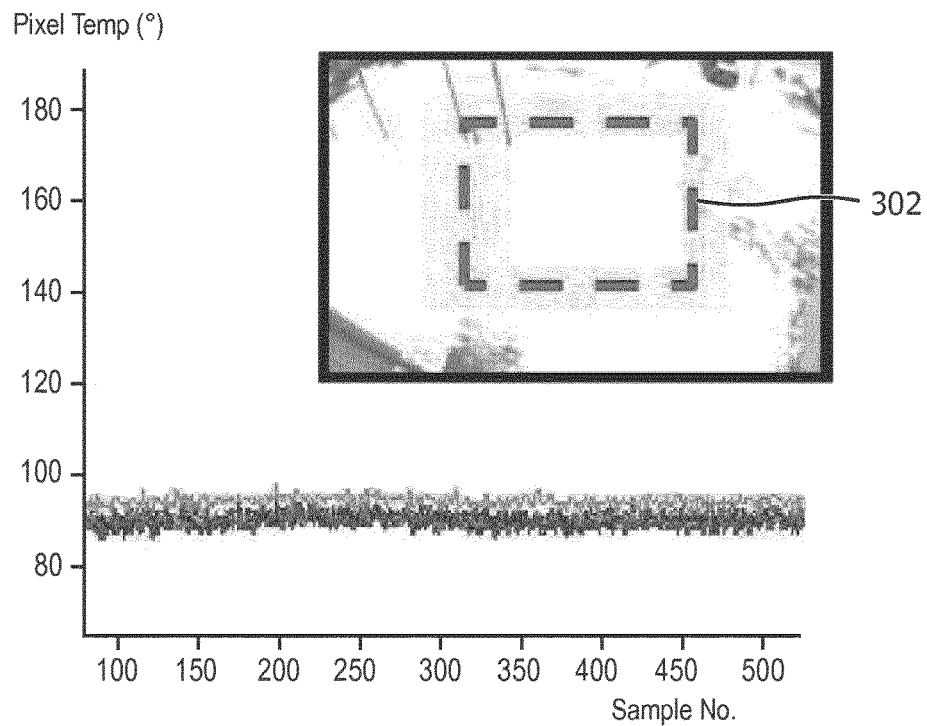
Figure 7D:
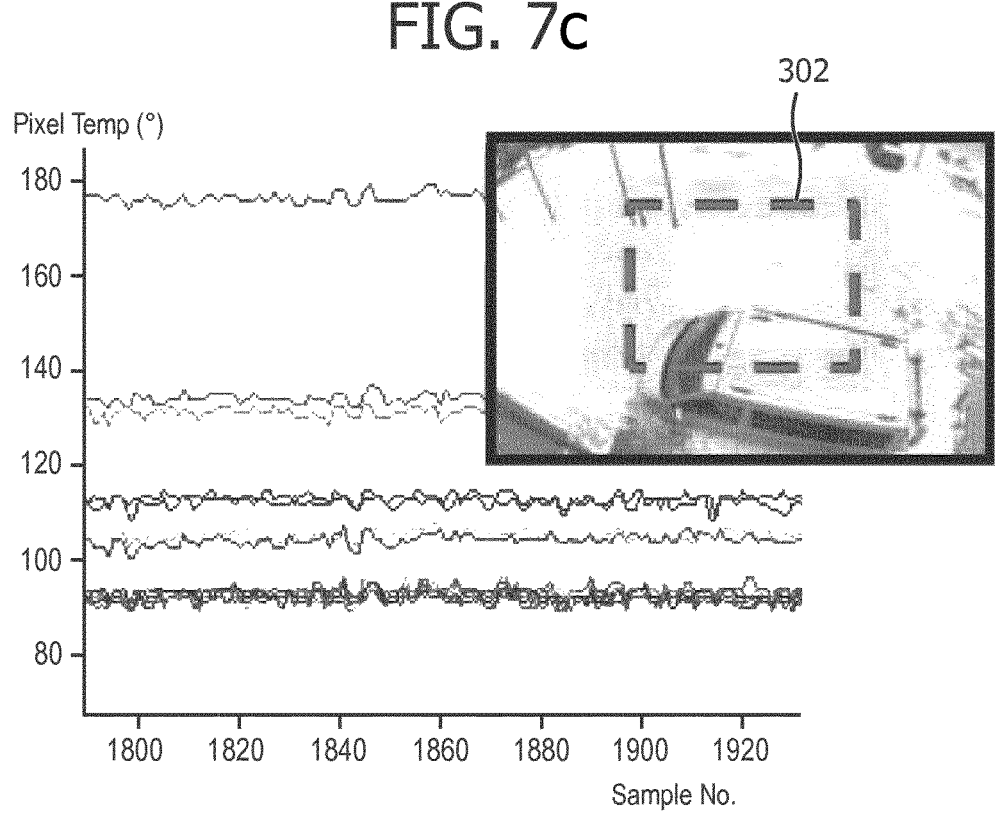

As shown in FIGS. 7c and 7d on a cold morning the control module 5 may identify a peak temperature measured by a pixel in the pixel array when no object is present in the SR 302 of the thermopile array sensor 2 of approximately 9° C., and a peak temperature measured by a pixel in the pixel array when an object is present in the SR 302 of the thermopile array sensor 2 of approximately 17.5° C.

The temperature values above are provided to merely give an indication of the way the temperature readings (and the ratio of the peak temperature measured by a pixel in the pixel array when no object is present in the SR 302 of the thermopile array sensor 2 and the peak temperature measured by a pixel in the pixel array when an object is present in the SR 302 of the thermopile array sensor 2) changes depending on weather conditions and are not intended to limit the present disclosure in any way.

In dependence on the ratio of the peak temperature measured by a pixel in the pixel array when no object is present in the SR 302 of the thermopile array sensor 2 and the peak temperature measured by a pixel in the pixel array when an object is present in the SR 302 of the thermopile array sensor 2, the control module 5 may be configured to vary the light to be emitted by the luminaire(s) 4 when operating in the first operating state (adjust the first illumination level). Thus the illumination level of the light emitted by the luminaire(s) 4 when no object is present in the SR 302 of the thermopile array sensor 2 may vary in dependence of the weather conditions of the SR 302 of the thermopile array sensor 2.

Similarly, in dependence on the ratio of the peak temperature measured by a pixel in the pixel array when no object is present in the SR 302 of the thermopile array sensor 2 and the peak temperature measured by a pixel in the pixel array when an object is present in the SR 302 of the thermopile array sensor 2, the control module 5 may be configured to vary the light to be emitted by the luminaire(s) 4 when operating in the second operating state (adjusts the second illumination level). Thus the illumination level of the light emitted by the luminaire(s) 4 when an object is present in the SR 302 of the thermopile array sensor 2 may vary in dependence of the weather conditions of the SR 302 of the thermopile array sensor 2.

The inventors have also recognised that objects in outdoor conditions are exposed to various conditions of sunlight during the course of the day, thereby having an impact on the way the control module 5 detects motion of an object in the SR 302 of the thermopile array sensor 2. In other words the inventors have identified that the robustness of the thermopile array sensor 2 decreases in periods of sunset and sundown, and detectability of motion of an object in the SR 302 of the thermopile array sensor 2 by the control module 5 is dependent on ambient temperature. This can result in missed motion detections by the control module 5, thereby bringing down the performance of the lighting system 100.

Thus to increase performance, the control module is configured to detect weather conditions of the environment in the SR 302 of the thermopile array sensor 2 based on the above described peak temperature contrast ratio, and based on the detected weather conditions, select an appropriate threshold temperature that must be measured by one or more pixel of the pixel array of the thermopile array sensor 2 in order for the control module 5 to detect motion in the SR 302 of thermopile array sensor 2 and control the luminaire(s) 4 to operate in the second operating state during which the luminaire(s) 4 illuminate the environment of the lighting system 100 by emitting light at a second illumination level.

Alternatively, the control module 5 is configured to detect weather conditions of the environment in the SR 302 of the thermopile array sensor 2 based on the above described peak temperature contrast ratio, and based on the detected weather conditions, select an appropriate threshold temperature increase (above the peak temperature measured by a pixel in the pixel array when no object is present in the SR 302 of the thermopile array sensor 2) that must be measured by one or more pixel of the pixel array of the thermopile array sensor 2 in order for the control module 5 to detect motion in the SR 302 of thermopile array sensor 2 and control the luminaire(s) 4 to operate in the second operating state during which the luminaire(s) 4 illuminate the environment of the lighting system 100 by emitting light at the second illumination level.

Thus it will be appreciated that the control module 5 may be configured to adapt its motion detection sensitivity based on the detected weather conditions (contrast of the object temperature against the background temperature in the scene).

Whilst it has been described above that the ratio of the peak temperature measured by a pixel in the pixel array when no object is present in the SR 302 and the peak temperature measured by a pixel in the pixel array when an object is present in the SR 302 may be used to adapt the motion detection sensitivity, the control module 5 may receive the temperature information from a source other than from the thermopile array sensor 2. For example, the temperature information can be obtained from a further temperature sensor (not shown in FIG. 1) coupled to the control module 5. Alternatively the temperature information may be estimated based on receiving time of day information from a timer (not shown in FIG. 1) coupled to the control module 5. The further temperature sensor and timer may be internal components of the controller 1. Alternatively the further temperature sensor and timer may be external to the controller 1.

Rainfall in the SR 302 the thermopile array sensor 2 can also be detected by the control module 5 based on the temperature data received from the thermopile array sensor 2. This is described with reference to FIG. 8.

Figure 8:
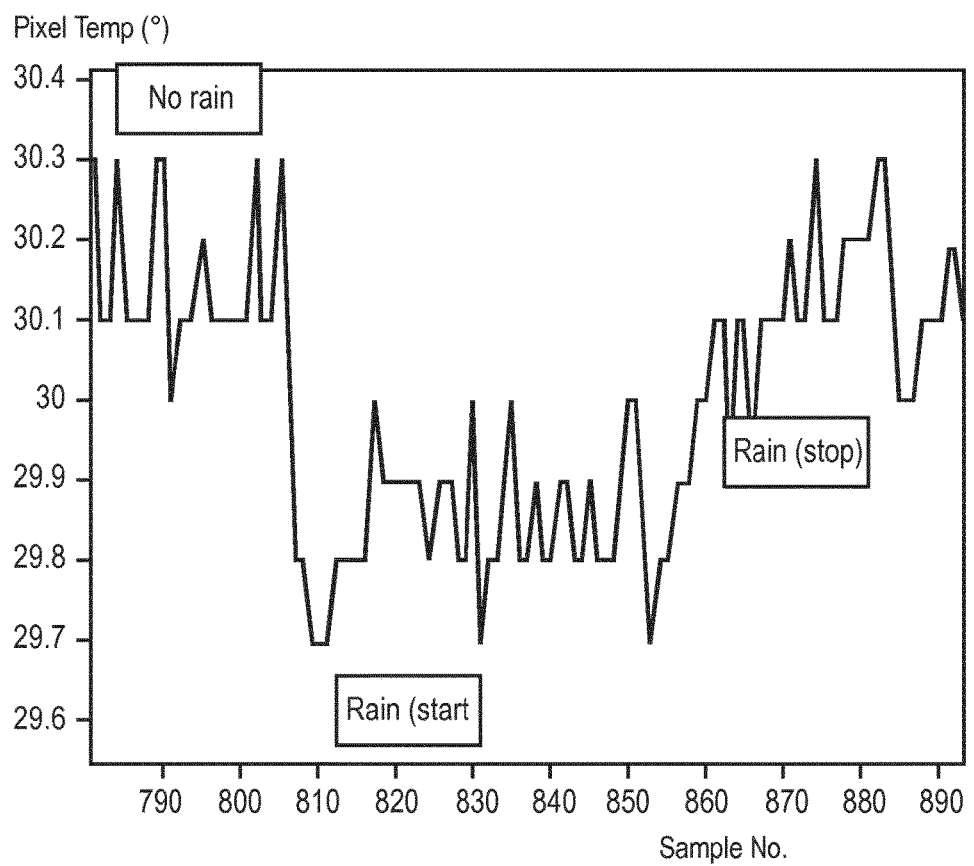
FIG. 8 illustrates how temperature data output from a pixel of a two dimensional thermopile array sensor is affected over a period of time due to rainfall.

FIG. 8 illustrates how detection of an object in the SR 302 of the thermopile array sensor 2 is affected by rainfall. In particular FIG. 8 shows the temperature measured by a single pixel in the pixel array of the thermopile array sensor 2 whilst an object remains in the SR 302 of the thermopile array sensor 2 both during no rainfall and during rainfall.

It can be seen in FIG. 8 that the pixel measures lower temperatures during rainfall than when there is no rainfall. The control module 5 is configured to detect when an increase in measured temperature caused by presence of an object in the SR 302 of the thermopile array sensor 2 has increased to a temperature that is lower than a range of increased temperatures that are typically reported due to presence of an object in the SR 302 of the thermopile array sensor 2, in order to detect rainfall.

In dependence on detecting rainfall in the SR 302 of the thermopile array sensor 2 the control module 5 may be configured to vary the light to be emitted by the luminaire(s) 4 when operating in the first operating state (adjusts the first illumination level). Thus the illumination level of the light emitted by the luminaire(s) 4 when no object is present in the SR 302 of the thermopile array sensor 2 may vary in dependence on detected rainfall in the SR 302 of the thermopile array sensor 2.

Similarly, in dependence on detecting rainfall in the SR 302 of the thermopile array sensor 2 the control module 5 may be configured to vary the light to be emitted by the luminaire(s) 4 when operating in the second operating state (adjusts the second illumination level). Thus the illumination level of the light emitted by the luminaire(s) 4 when an object is present in the SR 302 of the thermopile array sensor 2 may vary in dependence on detected rainfall in the SR 302 of the thermopile array sensor 2.

The temperature values shown in FIG. 8 are merely examples and are not intended to limit the present disclosure in any way.

Stagnation of water (i.e. puddles) on a surface (e.g. road) in the SR 302 the thermopile array sensor 2, and absorption of water into a surface in the SR 302 the thermopile array sensor 2 can also be detected by the control module 5 based on the temperature data received from the thermopile array sensor 2. In particular by the control module 5 monitoring the heating up/cooling down properties of the surface.

Figure 9A:
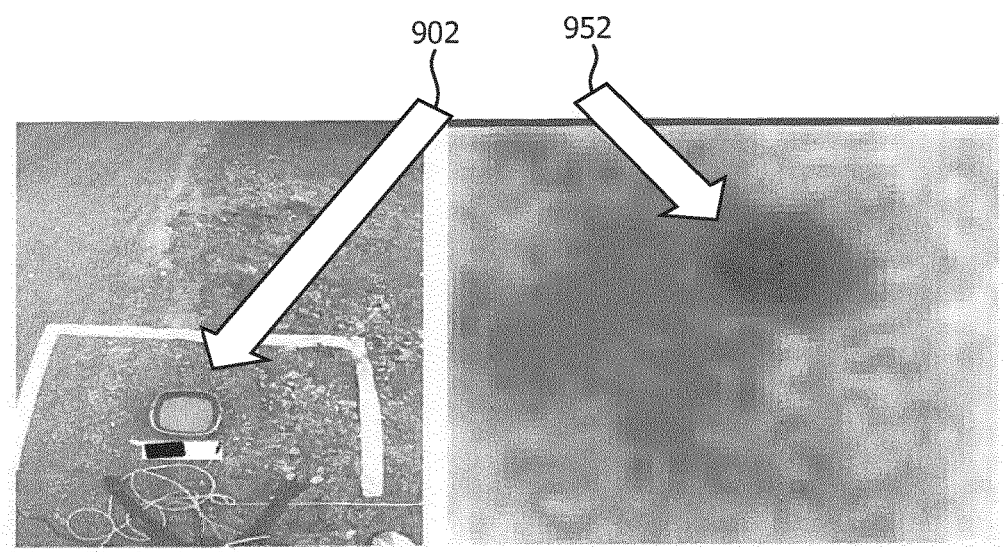
FIGS. 9a and 9b illustrates how water on roads can be detected by monitoring a thermal signature of a scene using a two dimensional thermopile array sensor.

FIG. 9a illustrates how the control module 5 can detect stagnation of water 902 on a surface (e.g. road) in the SR 302 the thermopile array sensor 2 by detecting that the temperature measured by a concentration of pixels of the pixel array of the thermopile array sensor 2 is below a temperature range measured by the remaining pixels of the pixel array of the thermopile array sensor 2. The thermal signature shown in FIG. 9a illustrates how pixels 952 focused on the stagnation of water 902 report a lower temperature (represented by the darker shade) than pixels not focused on the stagnation of water 902.

Over time the stagnation of water 902 will be absorbed into the surface in the SR 302 the thermopile array sensor 2. For example, water on an asphalt surface is absorbed into the asphalt surface over time.

The absorption of water into a surface (e.g. road) in the SR 302 the thermopile array sensor 2 can also be detected by the control module 5 monitoring the temperature data received from the thermopile array sensor 2.

Figure 9B:
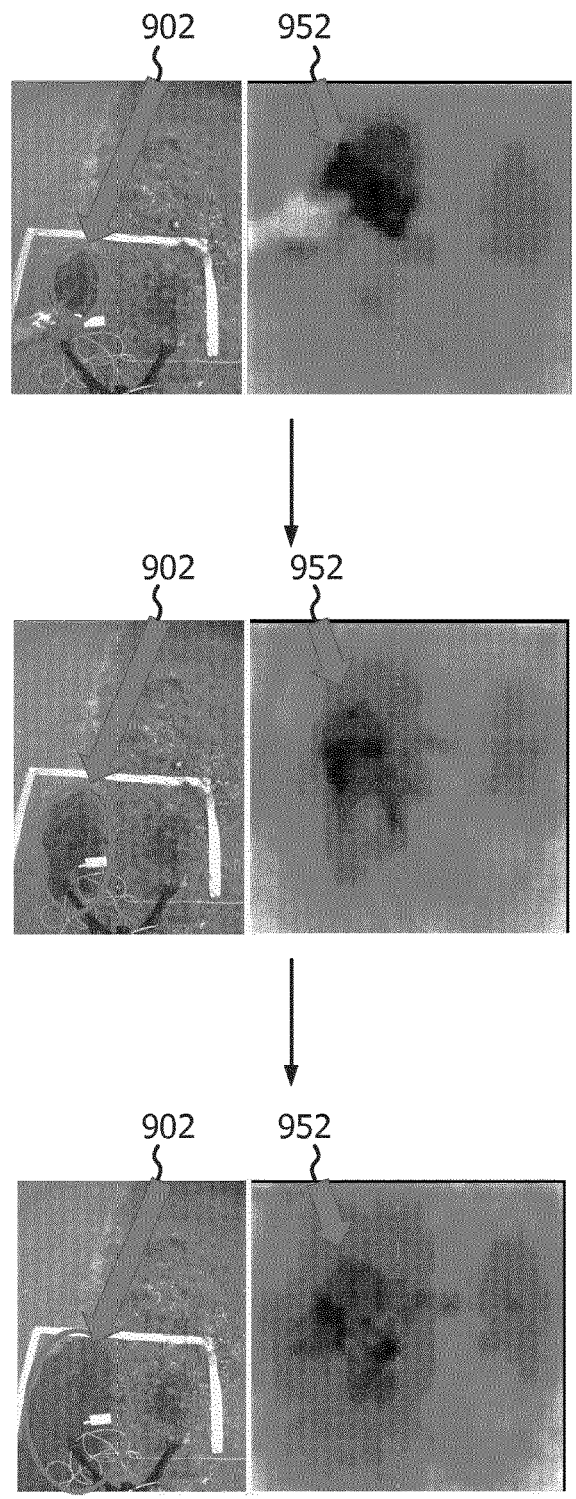

FIG. 9b illustrates how the control module 5 can detect absorption of water into a surface (e.g. road) in the SR 302 the thermopile array sensor 2 by monitoring how the temperature measured by the initial concentration of pixels 952 and the temperature measured by the pixels of the pixel array of the thermopile array sensor 2 adjacent to the initial concentration of pixels 952, changes over time.

In dependence on detecting stagnated water on a surface (or absorbed water in a surface) of the SR 302 of the thermopile array sensor 2 the control module 5 may be configured to vary the light to be emitted by the luminaire(s) 4 when operating in the first operating state (adjusts the first illumination level). Thus the illumination level of the light emitted by the luminaire(s) 4 when no object is present in the SR 302 of the thermopile array sensor 2 may vary in dependence on detecting stagnated water on a surface (or absorbed water in a surface) of the SR 302 of the thermopile array sensor 2.

Similarly, in dependence on detecting stagnated water on a surface (or absorbed water in a surface) of the SR 302 of the thermopile array sensor 2 the control module 5 may be configured to vary the light to be emitted by the luminaire(s) 4 when operating in the second operating state (adjusts the second illumination level). Thus the illumination level of the light emitted by the luminaire(s) 4 when an object is present in the SR 302 of the thermopile array sensor 2 may vary in dependence on detecting stagnated water on a surface (or absorbed water in a surface) of the SR 302 of the thermopile array sensor 2.

Thus as described above various types of conditions (road layout, weather conditions, rainfall, road conditions) of the environment in the SR 302 of the thermopile array sensor 2 can be detected by the control module 5 based on the temperature information received from the thermopile array sensor 2 and used to control the luminaire(s) 4.

The weather conditions, rainfall information, and road condition information (i.e. information related to stagnated water and absorbed water on a road surface) may be reported by the controller 1 via an interface (not shown in FIG. 1) to an external service (i.e. weather monitoring station or highways management station) to alert people to the conditions in the environment of the thermopile array sensor 2.

The SR 302 of the thermopile array sensor 2 may optionally be controllable using orientation control means (not shown in FIG. 1) coupled to the thermopile array sensor 2, whereby the orientation control means is configured to control the SR 302 of the thermopile array sensor 2 in dependence on the conditions (road layout, weather conditions, rainfall, road conditions) of the environment in the SR 302 of the thermopile array sensor 2. The orientation control means may comprise one or more electro-mechanical motors.

Alternatively or additionally the thermopile array sensor 2 may comprise an input (not shown in FIG. 1) via which orientation information may be received from a remote source such that the SR 302 of the thermopile array sensor 2 can be monitored and corrected or compensated for.

In the above described embodiments, the thermopile array sensor 2 may be one or two dimensional, comprising any number of pixels.

In certain road topologies, movement of an object is expected to be in a certain direction. For example, at a pedestrian crossing a person is expected to move within the confines of the pedestrian crossing to cross a road, along a sidewalk a person is expected to move along the sidewalk in one of two expected directions, and a vehicle is expected to move in a certain direction as it travels on a highway.

The inventors have identified that when the SR 302 associated with a one dimensional thermopile array sensor 2 is focused on such a road topology, the one dimensional thermopile array sensor 2 can be optimally oriented such that the control module 5 is able to estimate the direction of motion in the SR 302 of the one dimensional thermopile array sensor 2 (which otherwise requires a two dimensional thermopile array sensor) based on the temperature data output from each pixel of the one dimensional thermopile array sensor 2.

Figure 10:
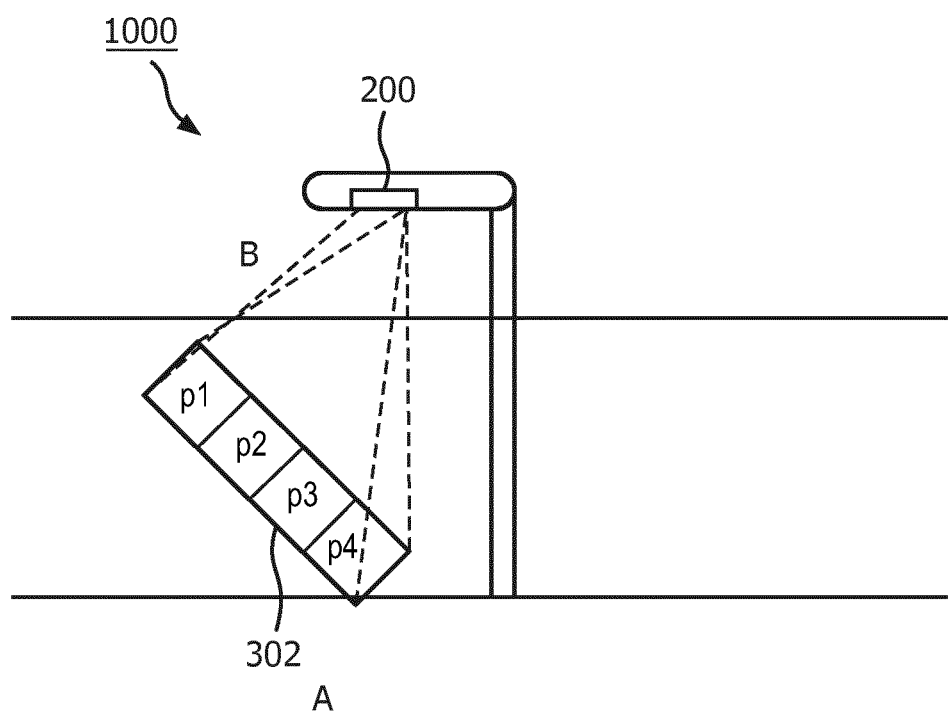
FIG. 10 illustrates the sensing region of a one dimensional thermopile array sensor.

FIG. 10 illustrates the SR of the one dimensional thermopile array 200 (comprising pixels p1-p4) shown in FIG. 2*a*. Whilst FIG. 10 shows the one dimensional thermopile array 200 being fully integrated into an outdoor street light 1000, at least one of the controller 1 and the one dimensional thermopile array 200 may be housed in a unit separate to the outdoor street light 300, albeit connected to the one or more lighting devices 4 of the outdoor street light 300.

In order to illustrate how direction information can be extracted from the temperature data output from each pixel of the one dimensional thermopile array sensor 200, we refer to an example scenario in which a person starting from a position indicated by 'A' in FIG. 10 crosses a road to a position indicated by 'B' in FIG. 10 (in a first direction), and then returns to position 'A' in the opposite direction.

Figure 11:
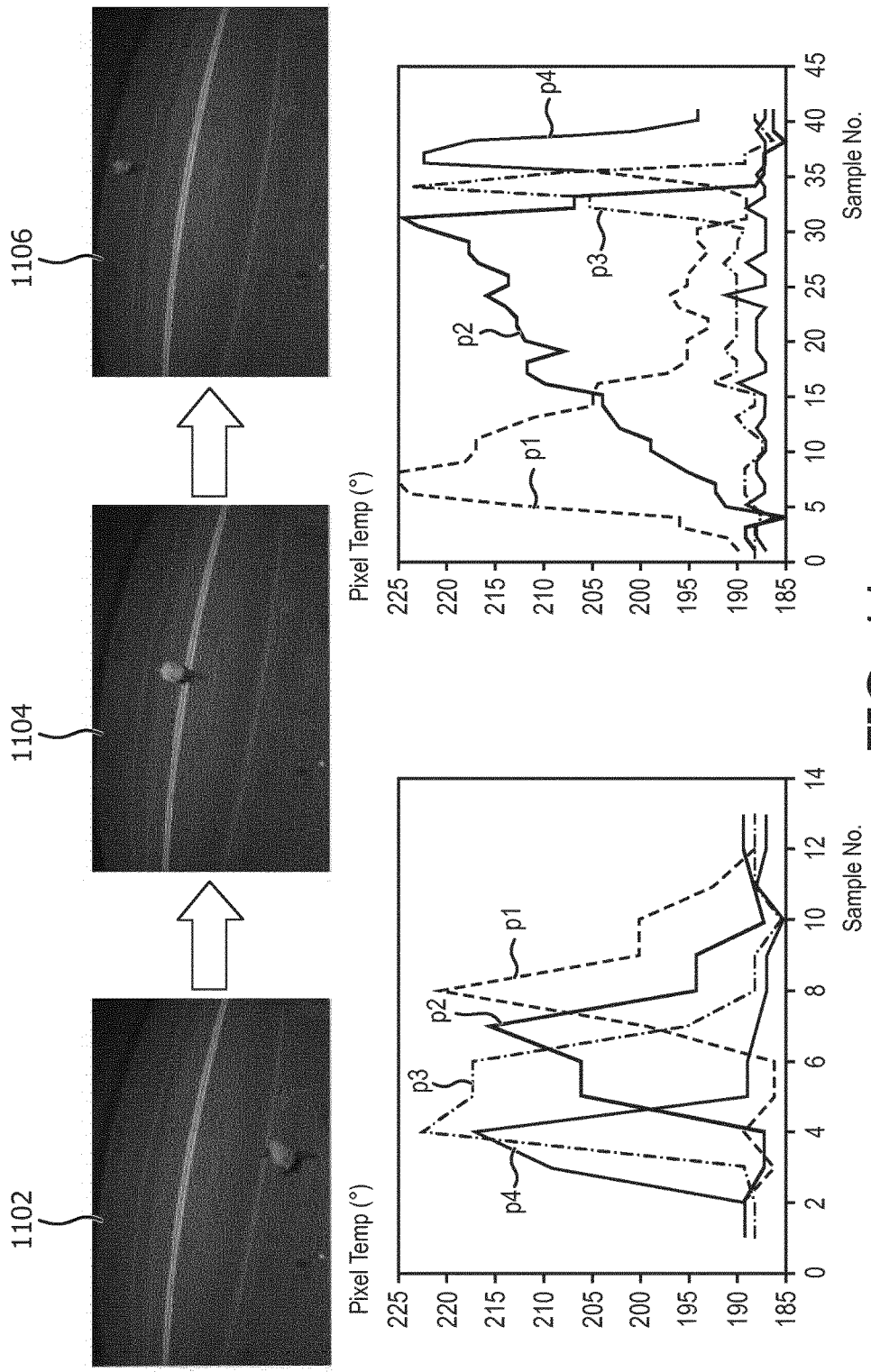
FIG. 11 graphically illustrates temperature data output from each pixel of a one dimensional thermopile array sensor during pedestrian motion detection.

FIG. 11, shows scenes 1102, 1104 and 1106 in which a person starting from position A crosses a road and walks through the SR 302 of thermopile array sensor 2 and arrives at position B (note that FIG. 11 does not show scenes in relation to when a person crosses the road and returns from position B to position A).

The left-hand graph illustrates the temperature measured by each of the four pixels (p1-p4) in the pixel array of the one dimensional thermopile array 200 over a plurality of samples, in particular the increase and subsequent decrease in temperature measured by each of the four pixels as a person starting from position A crosses a road and walks through the SR 302 of thermopile array sensor 2 and arrives at position B.

The right-hand graph illustrates the temperature measured by each of the four pixels (p1-p4) in the pixel array of the one dimensional thermopile array 200 over a plurality of samples, in particular the increase and subsequent decrease in temperature measured by each of the four pixels as a person starting from position B crosses the road and walks through the SR 302 of thermopile array sensor 2 and arrives at position A.

It will be apparent that the temperature measurements shown in the right-hand graph of FIG. 11 are less uniform than those shown in the left-hand graph of FIG. 11. This is due to the fact that in the experiment to obtain the temperature information shown in the right-hand graph of FIG. 11, the person walked from position B to position A at a slower speed than when the person walked from position A to position B, and the person temporarily paused whilst crossing the road from position B to position A.

In one embodiment, the control module 5 is configured to estimate the direction of motion in the SR 302 of the one dimensional thermopile array sensor 200 based on identifying the order that the pixels of the array report an increase in measured temperature. For example, when a person walks from position A to position B, as shown in the left-hand graph of FIG. 11 pixel p4 first reports an increase in measured temperature, followed by pixel p3, then pixel p2 and finally pixel p1. However when a person walks from position B to position A, as shown in the right-hand graph of FIG. 11 pixel p1 first reports an increase in measured temperature, followed by pixel p2, then pixel p3 and finally pixel p4.

The control module 5 may identify an increase is measured temperature of a pixel when the temperature measured by that pixel has reached a predetermined threshold temperature or increases by a predetermined amount above the peak temperature measured by a pixel in the pixel array when no object is present in the SR 302 of the one dimensional thermopile array sensor 200, In this embodiment, the control module 5 has a priori knowledge of the expected order that the pixels of the array report an increase in measured temperature when an object moves in the expected direction(s) of movement of an object in the SR 302 of the one dimensional thermopile array sensor 200 given the road topology. The control module 5 is configured to only control the luminaire(s) 4 in dependence on detecting motion in the expected direction(s) (identified based on the order that the pixels of the array report an increase in measured temperature).

Crosstalk refers to the phenomenon where radiation received at one pixel radiates outwards to affect neighboring pixels. The cross-talk between neighbouring pixels, impacts the way a temperature reading is observed on a pixel, and its neighbours. Often efforts are made to minimize this crosstalk; however the inventors have recognized that the spatiotemporal crosstalk between neighbouring pixels of the one dimensional thermopile array sensor 200 can be exploited to estimate the direction of motion in the SR 302 of the one dimensional thermopile array sensor 200.

That is, the inventors have recognized that the direction of incident radiation varies the crosstalk experienced by the one dimensional thermopile array sensor 200, in particular that the crosstalk affects the gradient of a measured temperature increase output from a pixel and the gradient of a measured temperature decrease output from a pixel, and that the direction of incident radiation varies the gradients of measured temperature increases and temperature decreases output from the pixels of the one dimensional thermopile array sensor 200

In one embodiment, the control module 5 is configured to estimate the direction of motion in the SR 302 of the one dimensional thermopile array sensor 200 based on the gradients of measured temperature increases and temperature decreases output from the pixels of the one dimensional thermopile array sensor 200.

In this embodiment, the control module 5 has a priori knowledge of the expected gradients of measured temperature increases and temperature decreases output from the pixels of the one dimensional thermopile array sensor 200 when an object moves in the expected direction(s) of movement of an object in the SR 302 of the one dimensional thermopile array sensor 200 given the road topology. The control module 5 is configured to only control the luminaire(s) 4 in dependence on detecting motion in the expected direction(s) (identified based on gradients of measured temperature increases and temperature decreases output from the pixels of the one dimensional thermopile array sensor 200).

In the above described embodiments, to enable the one dimensional thermopile array sensor 200 to be used to estimate the direction of motion in the SR 302 of the one dimensional thermopile array sensor 2 the orientation of the one dimensional thermopile array sensor 200 should be offset from its most sensitive direction (which is the same as the expected direction) by an angle θ in either direction of rotation (clockwise or anti-clockwise). The angle θ may be in the range of 0°<θ<90° in dependence on the sensitivity/efficiency of the one dimensional thermopile array sensor 200.

It will be appreciated the above embodiments have been described only by way of example.

Whilst embodiments have been described above with reference to the temperature sensor being a thermopile array sensor 2, embodiments are not limited to using such a sensor as the temperature sensor 2. The temperature sensor 2 may be any sensor comprising a plurality of temperature sensing elements that provides an output signal which represents real temperature data for each temperature sensing element. For example the temperature sensor 2 may comprise a set of cascaded PIR elements (e.g. in a PIR curtain motion detector).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller comprising:
an output for controlling one or more outdoor lighting devices to illuminate an outdoor environment, wherein the one or more outdoor lighting devices emit light at an illumination level;
an input for receiving temperature information from a temperature sensor comprising a plurality of temperature sensing elements; and
a control module configured to:
detect motion of an object in a sensing region of the temperature sensor based on the temperature information received from the temperature sensor and control the illumination level of the one or more lighting devices based on the detected motion; and
detect physical or environmental conditions, comprising weather conditions, of said environment in said sensing region, based on the temperature information received from the temperature sensor, wherein the weather conditions are detected based on a ratio of a peak temperature measured by the temperature sensor when no object is present in the sensing region of the temperature sensor and a peak temperature measured by the temperature sensor when an object is present in the sensing region of the temperature sensor, and further control the illumination level of the one or more lighting devices based on the detected physical or environmental conditions.

2. The controller according to claim 1, wherein the control module is further configured to classify the object as one of a plurality of object types and control the one or more lighting devices based on the object type.

3. The controller according to claim 1, wherein the detected physical or environmental conditions of said environment in said sensing region comprise road layout information, wherein the control module is configured to control the one or more lighting devices based on the detected road layout information.

4. The controller according to claim 1, wherein the control module is configured to adapt its motion detection sensitivity based on the ratio of a peak temperature measured by the temperature sensor when no object is present in the sensing region of the temperature sensor and a peak temperature measured by the temperature sensor when an object is present in the sensing region of the temperature sensor.

5. The controller according to any of claim 1, wherein the control module is configured to adapt its motion detection sensitivity based on (i) temperature information received from a further temperature sensor coupled to said control module, or (ii) time of day information received from a timer coupled to said control module.

6. The controller according to claim 1, wherein the control module is configured to detect rainfall in said environment in said sensing region using the temperature information received from the temperature sensor and further control the one or more lighting devices based on the detected rainfall.

7. The controller according to claim 1, wherein the detected physical or environmental conditions of said environment in said sensing region comprise stagnation of water on a surface in said sensing region, wherein the control module is configured to control the one or more lighting devices based on the detected water stagnation.

8. The controller according to claim 1, wherein the detected physical or environmental conditions of said environment in said sensing region comprise absorption of water in a surface in said sensing region, wherein the control module is configured to control the one or more lighting devices based on the detected surface water absorption.

9. The controller according to claim 1, wherein the temperature sensor is a one dimensional thermopile array sensor and the control module is further configured to:
   detect the direction of motion of an object in the sensing region of the one dimensional thermopile array sensor based on the temperature information received from the one dimensional thermopile array sensor; and
   control the one or more lighting devices based on the detected direction of motion.

10. An outdoor lighting system comprising:
   the controller;
   the one or more lighting devices; and
   the temperature sensor of claim 1.

11. The outdoor lighting system of claim 10, wherein the orientation of the sensing region of the temperature sensor is controlled based on the detected physical or environmental conditions of said environment in said sensing region using orientation control means coupled to the temperature sensor.

12. The outdoor lighting system of claim 10, wherein the temperature sensor comprises an input for receiving orientation information from a remote source, and the orientation of the sensing region of the temperature sensor is controlled based on said received orientation information.

13. The outdoor lighting system of claim 10, wherein the temperature sensor is a thermopile array sensor.

14. A computer program product for controlling one or more outdoor lighting devices to illuminate an outdoor environment, wherein the one or more outdoor lighting devices emit light at an illumination level, the computer program product comprising code embodied on a non-transitory computer-readable medium and being configured so as when executed on a processor to:
   receive temperature information from a temperature sensor comprising a plurality of temperature sensing elements;
   detect motion in a sensing region of the temperature sensor based on the temperature information received from the temperature sensor and control the illumination level of the one or more lighting devices based on the detected motion; and
   detect physical or environmental conditions, comprising weather conditions, of said environment in said sensing region based on the temperature information received from the temperature sensor, wherein the weather conditions are detected based on a ratio of a peak temperature measured by the temperature sensor when no object is present in the sensing region of the temperature sensor and a peak temperature measured by the temperature sensor when an object is present in the sensing region of the temperature sensor, and further control the illumination level of the one or more lighting devices based on the detected physical or environmental conditions.

* * * * *